United States Patent [19]

Zimmerman

[11] 4,326,042

[45] Apr. 20, 1982

[54] MORPHOLINE AND PIPERAZINE DERIVATIVES IN A CATALYST SYSTEM FOR POLYESTER-BASED POLYURETHANE FOAMS

[75] Inventor: Robert L. Zimmerman, Austin, Tex.

[73] Assignee: Texaco Inc., White Plains, N.Y.

[21] Appl. No.: 256,360

[22] Filed: Apr. 22, 1981

[51] Int. Cl.³ ............................................. C08G 18/14
[52] U.S. Cl. .................................. 521/115; 252/426; 521/129; 528/53
[58] Field of Search ................. 521/129, 115; 528/53; 252/426

[56] References Cited

U.S. PATENT DOCUMENTS 3,645,925  2/1972  Speranza et al. ...................... 544/87
3,993,652  11/1976  Bechara et al. ...................... 521/115
4,228,248  10/1980  Zimmerman ......................... 521/115

*Primary Examiner*—Maurice J. Welsh
*Attorney, Agent, or Firm*—Carl G. Ries; Jack H. Park; David L. Mossman

[57] ABSTRACT

The use of N-methoxypropylmorpholine, N-butylmorpholine and N,N'-dimethylpiperazine together as a catalyst system in an activator solution to give finer, more uniform cells to polyester-based polyurethane foams is described. While each of the amine catalysts has disadvantages when used alone in an activator solution, it was surprisingly discovered that together as a catalyst system none of the disadvantages were observed in the resulting polyurethane foam.

9 Claims, No Drawings

MORPHOLINE AND PIPERAZINE DERIVATIVES IN A CATALYST SYSTEM FOR POLYESTER-BASED POLYURETHANE FOAMS

BACKGROUND OF THE INVENTION

1. Field of the Invention

The invention pertains to the field of urethane catalysts and is more particularly related to catalyst systems employing morpholine and piperazine derivatives.

2. Description of the Prior Art

The use of a catalyst in preparing polyurethanes by the reaction of a polyisocyanate, a polyol and perhaps other ingredients is known. The catalyst is employed to promote at least two, and sometimes three major reactions that must proceed simultaneously and competitively at balanced rates during the process in order to provide polyurethanes with the desired physical characteristics. One reaction is a chain-extending isocyanate-hydroxyl reaction by which a hydroxyl-containing molecule is reacted with an isocyanate-containing molecule to form a urethane. This increases the viscosity of the mixture and provides a polyurethane containing secondary nitrogen atoms in the urethane groups. A second reaction is a crosslinking isocyanate urethane reaction by which an isocyanate-containing molecule reacts with a urethane group containing a secondary nitrogen atom. The third reaction which may be involved is an isocyanate-water reaction by which an isocyanate-terminated molecule is extended and by which carbon dioxide is generated to blow or assist in the blowing of foam. This third reaction is not essential if an extraneous blowing agent, such as a halogenated, normally liquid hydrocarbon, carbon dioxide, etc., is employed, but is essential if all or even part of the gas for foam generation is to be generated by this in situ reaction (e.g., in the preparation of "one-shot" flexible polyurethane foams).

The reactions must proceed simultaneously at optimum balanced rates relative to each other in order to obtain a good foam structure. If carbon dioxide evolution is too rapid in comparison with chain extension, the foam will collapse. If the chain extension is too rapid in comparison with carbon dioxide evolution, foam rise will be restricted, resulting in a high density foam with a high percentage of poorly defined cells. The foam will not be stable in the absence of adequate crosslinking.

It has long been known that tertiary amines are effective for catalyzing the second crosslinking reaction. Typical amines of this type are found in U.S. Pat. Nos. 4,021,445; 3,925,268; 3,786,005; 4,011,223; 4,048,107; 4,038,210, 4,033,911; 4,026,840; 4,022,720 and 3,912,689. However, many amines of this class have a strong amine odor which is carried over to the polyurethane foam.

Aminoamides may also be used as urethane catalysts such as the N,N-bis(3-dimethylaminopropyl)acetamide of U.S. Pat. No. 3,234,153. Morpholine derivatives as urethane catalysts are described in U.S. Pat. No. 3,645,925 which discloses 4,4'-dimorpholinodiethylether and U.S. Pat. No. 4,228,248 which uses certain N-alkoxyalkyl morpholines. A method for making N-alkylmorpholines, from which some of the previously described catalysts may be made, is described in U.S. Pat. No. 3,087,928.

In still other cases, some tertiary amines impart a color to the product foam known as "pinking" and/or cause or fail to prevent undue foam shrinkage. For example, N-methoxypropylmorpholine is an amine catalyst which will produce a pink foam.

In addition to problems of odor, pinking, etc., other tertiary amines suffer still further deficiencies. For example, in some instances the compounds are relatively high in volatility leading to obvious safety problems. In addition, some catalysts of this type do not provide sufficient delay in foaming, which delay is particularly desirable in molding applications to allow sufficient time to situate the preform mix in the mold. Yet other catalysts, while meeting specifications in this area, do not yield foams with a desirable tack-free time. In addition, some catalysts of this type are solids causing handling problems. In many cases, blends of catalysts containing different tertiary amine groups must be utilized in order to achieve the desired balance between gelling and flowing of foams. Lastly, some catalysts of this type cannot be used to form the desired polyurethane foam, such as a low-density foam, say of the polyester type.

The manufacture of polyester urethane foams frequently employs an activator solution which is a blend of the catalyst, surfactant and water to be used in making the foam. The use of an activator solution reduces the number of streams that must match up at the mixing head thereby cutting down on mixing adjustment problems. However, if an activator solution is used it must be homogeneous; that is, it must not separate into different phases to function properly in the foam formulation. If a homogeneous activator solution is used, it must have a low viscosity so that it can be easily pumped to the mixing head. If a homogeneous activator solution is not employed, the materials would have to be pumped separately to the mixing head. This results in foam cells that are not as fine or as uniform as when an acitivator solution is used. N-butylmorpholine is an example of an amine catalyst which does not give a homogeneous activator solution.

It would therefore be a substantial advance in the art if an amine catalyst or catalyst system were discovered which would overcome the disadvantages of the prior art.

SUMMARY OF THE INVENTION

This invention is a catalyst system for use in reacting with an organic polyisocyanate and an organic polyester polyol to produce a polyurethane, the catalyst system comprising catalytic amount of N-methoxypropylmorpholine, N-butylmorpholine and N,N'-dimethylpiperazine.

DETAILED DESCRIPTION OF THE PREFERRED EMBODIMENTS

The compounds useful here may be prepared by resort to a wide variety of synthetic techniques. However, preferably the appropriate alkoxy ethanol is condensed with morpholine in the presence of a catalyst according to the procedure of U.S. Pat. No. 3,087,928. For example, N-methoxypropylmorpholine may be made by reacting methoxypropylamine with morpholine using a hydrogenation-dehydrogenation catalyst as described in copending patent application Ser. No. 256,359 filed Apr. 22, 1981.

The surprising fact about the catalyst system of this discovery is that each of the amine catalysts that make up the system would be unsatisfactory if used alone or paired with one of the other catalysts. However, when all three amines are used together, the results are very satisfactory.

For example, as will be demonstrated, the use of N-methoxypropylmorpholine by itself will give a homogeneous activator solution but will cause the resultant polyester urethane foam to be light pink in color. Other experiments were performed using different alkoxyalkylmorpholines (such as N-ethoxyethylmorpholine), but it was surprisingly found that only N-methoxypropylmorpholine was suitable. For the purposes of this invention, N-methoxypropylmorpholine is taken as having the propyl moiety either 1,2 connected or 1,3 connected with respect to the rest of the molecule chain.

Likewise, N-butylmorpholine, which may be made by the methods of U.S. Pat. No. 3,087,928, is unsuitable when used alone because it will not give a homogeneous activator solution. Even when used in conjunction with N-methoxypropylmorpholine, the resulting activator solution is non-homogeneous. As used in this specification, "non-homogeneous" refers to a solution which will separate into at least two phases or layers which are not miscible. N-butylmorpholine is defined within this invention to be either N-sec-butylmorpholine or N-n-butylmorpholine. It will be demonstrated that both forms are useful for the purpose of this invention.

The third component, N,N-dimethylpiperazine, has the disadvantage of being too much of a gelation catalyst for polyester polyurethanes. However, when used in small quantities it seems to be the crucial component for making activator solutions with N-butylmorpholine and N-methoxypropylmorpholine homogeneous.

The three components forming the catalyst system of this invention may be used as a group alone or in conjunction with other urethane catalysts known in the art to be catalytically active. It is especially preferred that the components of this invention be used in the following proportions, based on the total weight of catalyst used (including any co-catalyst): 20 to 60 weight percent of N-methoxypropylmorpholine, 20 to 60 weight percent of N-butylmorpholine and 5 to 15 weight percent of N,N'-dimethylpiperazine.

No limitations are placed on the number or kinds of other components that would ordinarily make up the activator solution such as, for example, surfactants, water, etc. Nor are any limitations placed on the other components used to make the ultimate polyurethane foam. Suitable polyols, isocyanates and co-catalysts may be found throughout the prior art, such as those listed in U.S. Pat. No. 4,228,248 incorporated by reference herein. While activator solutions seem to be used in industry only for polyester-based foam, it is anticipated within the scope of this invention that this particular, narrow catalyst system could possibly be used in other polyurethane applications, such as polyether-based foams.

The invention will be illustrated further with respect to the following specific examples, which are given by way of illustration and not as limitations on the scope of this invention.

EXAMPLE I

Table I summarizes the results of attempting to make homogeneous activator solutions by mixing the indicated components in the proportions shown. The numbers refer to parts by weight.

TABLE I

|  | A | B | C | D | E | F | G | H | I | J |
|---|---|---|---|---|---|---|---|---|---|---|
| FOMREZ ®M66-82* | 1.3 | 1.3 | 1.3 | 1.3 | 1.3 | 1.3 | 1.3 | 1.3 | 1.3 | 1.3 |
| FOMREZ 10-58* | 0.5 | 0.5 | 0.5 | 0.5 | 0.5 | 0.5 | 0.5 | 0.5 | 0.5 | 0.5 |
| N-coco morpholne | 1.2 | 1.2 | 1.2 | 1.2 | 1.2 | 1.2 | 1.2 | 1.2 | 1.2 | 1.2 |
| N,N-dimethylhexadecylamine | 0.3 | 0.3 | 0.3 | 0.3 | 0.3 | 0.3 | 0.3 | 0.3 | 0.3 | 0.3 |
| N-sec-butylmorpholine | 0.8 | 0.6 | 0.6 | — | — | — | — | 1.6 | — | — |
| N-n-butylmorpholine | — | — | — | 0.6 | 0.6 | 0.8 | 0.8 | — | 1.6 | — |
| N-methoxypropylmorpholine | 0.8 | 1.0 | 1.0 | 1.0 | 1.0 | 0.8 | 0.8 | — | — | 1.6 |
| N,N'-dimethylpiperazine | — | — | 0.16 | — | 0.16 | — | 0.16 | — | — | — |
| Water | 3.7 | 3.7 | 3.7 | 3.7 | 3.7 | 3.7 | 3.7 | 3.7 | 3.7 | 3.7 |
| Homogenous | No | No | Yes | No | Yes | No | Yes | No | No | Yes |

*Organic surfactants sold by Witco Chemical Corp.

It is noted that neither sec-butylmorpholine nor n-butylmorpholine give a homogeneous activator solution, runs H and I. Even when these two compounds are separately blended with N-methoxypropylmorpholine homogeneous activators are not produced, runs A, B, D and F. When N,N'-dimethylpiperazine is added, homogeneous activator solutions are obtained, see runs C, E and G. While N-methoxypropylmorpholine by itself gave a homogeneous activator solution (run J), it will be shown in the following example that it does not give a white foam.

EXAMPLE II

In this example polyester-based urethane foams are prepared using the catalyst system of this invention along with one foam using only N-methoxypropylmorpholine and a cocatalyst. The results are summarized in Table II where the numbers again refer to parts by weight.

TABLE II

|  | K | L | M | N | P |
|---|---|---|---|---|---|
| FOMREZ 56* | 100 | — | — | — | — |
| FOMREZ 53* | — | 100 | 100 | 100 | 100 |
| FOMREZ M66-82 | 1.2 | 1.2 | 1.2 | 1.3 | 1.3 |
| FOMREZ 10-58 | — | — | — | 0.5 | 0.5 |
| Water | 3.6 | 3.6 | 3.6 | 3.7 | 3.7 |
| N-cocomorpholine | — | — | — | 1.2 | 1.2 |
| N,N-dimethylhexadecylamine | 0.1 | 0.1 | 0.1 | 0.3 | 0.3 |
| N-methoxypropylmorpholine | 3.0 | 1.14 | 0.91 | 0.8 | 0.8 |
| N-sec-butylmorpholine | — | 0.68 | — | 0.8 | — |
| N-n-butylmorpholine | — | — | 0.91 | — | 0.8 |
| N,N'-dimethylpiperazine | — | 0.18 | 0.18 | 0.16 | 0.16 |
| Toluene diisocyanate | 43 | 43 | 43 | 48.4 | 48.4 |
| Index | 1.0 | 1.0 | 1.0 | 1.1 | 1.1 |
| Cream time (seconds) | 13 | 12 | 10 | 10 | 10 |
| Rise time (seconds) | 95 | 80 | 70 | 62 | 64 |
| Foam color after 1 hr at 180° C. | Light pink | White | | | |

*FOMREZ 56 and FOMREZ 53 are polyester polyols sold by Witco Chemical Corp., both with hydroxyl numbers of 53.

It may be seen that Foam K using just N-methoxylpropylmorpholine as the catalyst was a light pink foam which is unsuitable for applications having tight color specifications. Foams L, M, N and P using all of the catalysts found necessary in this invention were white foams with fine uniform cells. In addition, these foams had the added advantage of being low in odor. Therefore, it may be seen that the catalyst system of this invention is particularly suited to form homogeneous activator solutions useful in the preparation of polyester-based urethane foams thereby minimizing mixing coordination problems. The activator solutions help produce foams with finer, more uniform cells, and it has been shown that the catalyst system of this invention produces foam that does not discolor and that has a low odor. Further, activator solutions may be made with viscosities low enough that they can be easily pumped to the mixing head. It is surprising to find all of these advantages in an amine catalyst system where each amine if used separately would be unsatisfactory.

I claim:

1. A catalyst system for use in reacting with an organic polyisocyanate and an organic polyester polyol to produce a polyurethane, the catalyst system comprising catalytic amounts of N-methoxypropylmorpholine, N-butylmorpholine and N,N'-dimethylpiperazine.

2. The catalyst system of claim 1 in which N-methoxypropylmorpholine makes up 20 to 60 weight percent of the total catalyst portion, N-butylmorpholine makes up 20 to 60 weight percent of the total catalyst portion and N,N'-dimethylpiperazine makes up 5 to 15 weight percent of the total catalyst portion.

3. An activator solution for use in reacting with an organic polyisocyanate and an organic polyester polyol to produce a polyurethane, the activator solution comprising one or more surfactants, water and catalytic amounts of N-methoxypropylmorpholine, N-butylmorpholine and N,N'-dimethylpiperazine.

4. The activator solution of claim 3 in which N-methoxypropylmorpholine makes up 20 to 60 weight percent of the total catalyst portion, N-butylmorpholine makes up 20 to 60 weight percent of the total catalyst portion and N,N'-dimethylpiperazine makes up 5 to 15 weight percent of the total catalyst portion.

5. A method for producing a polyurethane which comprises reacting an organic polyisocyanate with an organic polyester polyol in the presence of a catalytic amount of an amine catalyst blend consisting of N-methoxypropylmorpholine, N-butylmorpholine and N,N'-dimethylpiperazine.

6. The method for producing a polyurethane described in claim 5 in which N-methoxypropylmorpholine makes up 20 to 60 weight percent of the total catalyst portion, N-butylmorpholine makes up 20 to 60 weight percent of the total catalyst portion and N,N'-dimethylpiperazine makes up 5 to 15 weight percent of the total catalyst portion.

7. The method of claim 5 or 6 wherein a flexible polyester polyurethane foam is prepared which comprises reacting in the presence of a blowing agent, toluene diisocyanate with a hydroxyl terminated condensation product of a polycarboxylic acid and a polyhydric alcohol in the presence of said catalyst, said toluene diisocyanate being employed in an amount sufficient to provide 0.9 to 1.5 mole equivalents of isocyanate groups per mole equivalent of hydroxyl groups, said condensation product having a functionality of from about 2 to 4 and a molecular weight from about 2,000 to about 6,000 and a hydroxyl number ranging from about 25 to about 100.

8. A method for producing a polyurethane which comprises reacting an organic polyisocyanate with an organic polyester polyol in the presence of an activator solution containing a catalytic amount of an amine catalyst blend consisting of N-methoxypropylmorpholine, N-butylmorpholine and N,N'-dimethylpiperazine.

9. The method for producing a polyurethane described in claim 8 in which N-methoxypropylmorpholine makes up 20 to 60 weight percent of the total catalyst portion, N-butylmorpholine makes up 20 to 60 weight percent of the total catalyst portion and N,N'-dimethylpiperazine makes up 5 to 15 weight percent of the total catalyst portion.

* * * * *